April 12, 1966  H. ZAHORANSKY  3,245,554
AUTOMATIC MACHINE FOR THE MANUFACTURE OF BRUSHES
Filed Oct. 11, 1963  6 Sheets-Sheet 1
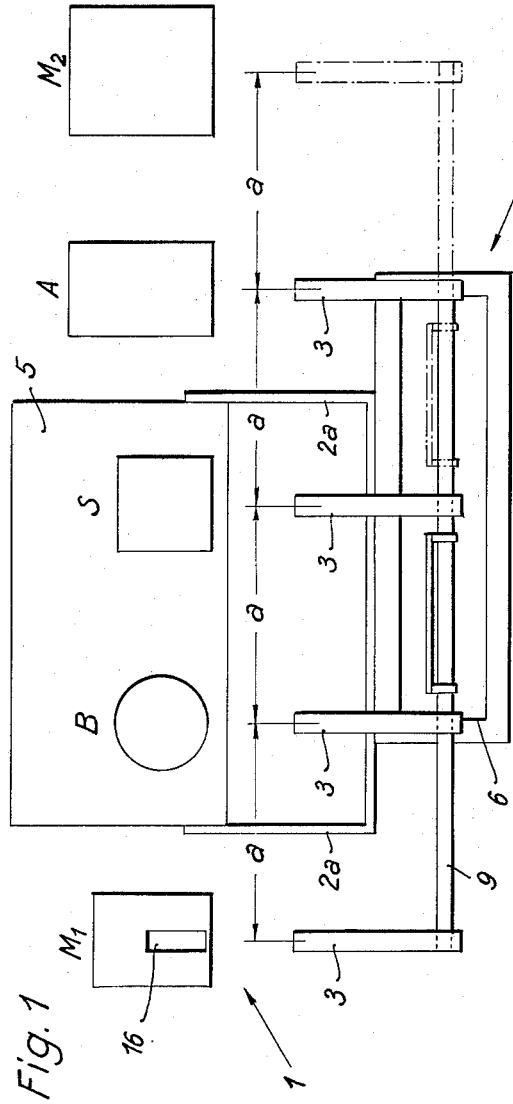
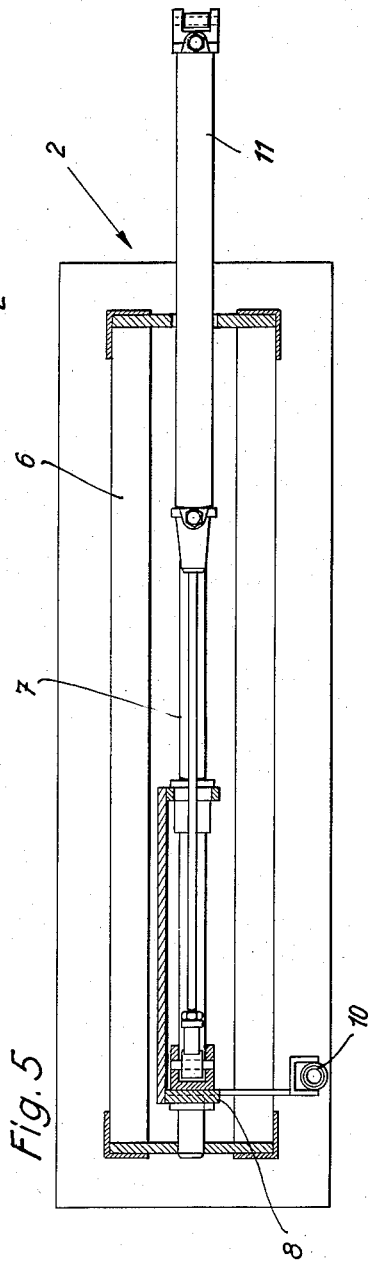
Inventor
Heinz Zahoransky
by Michael S. Striker
Atty

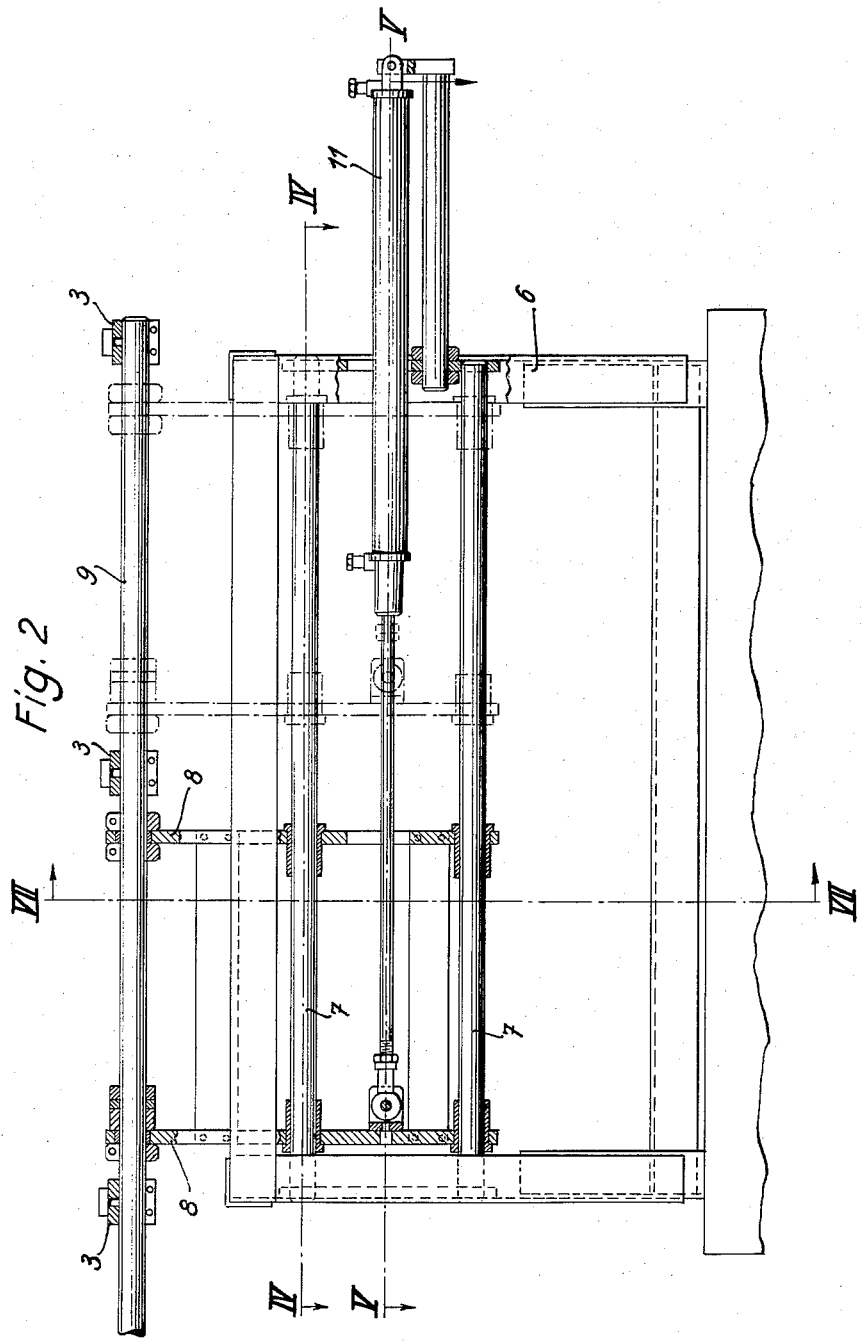

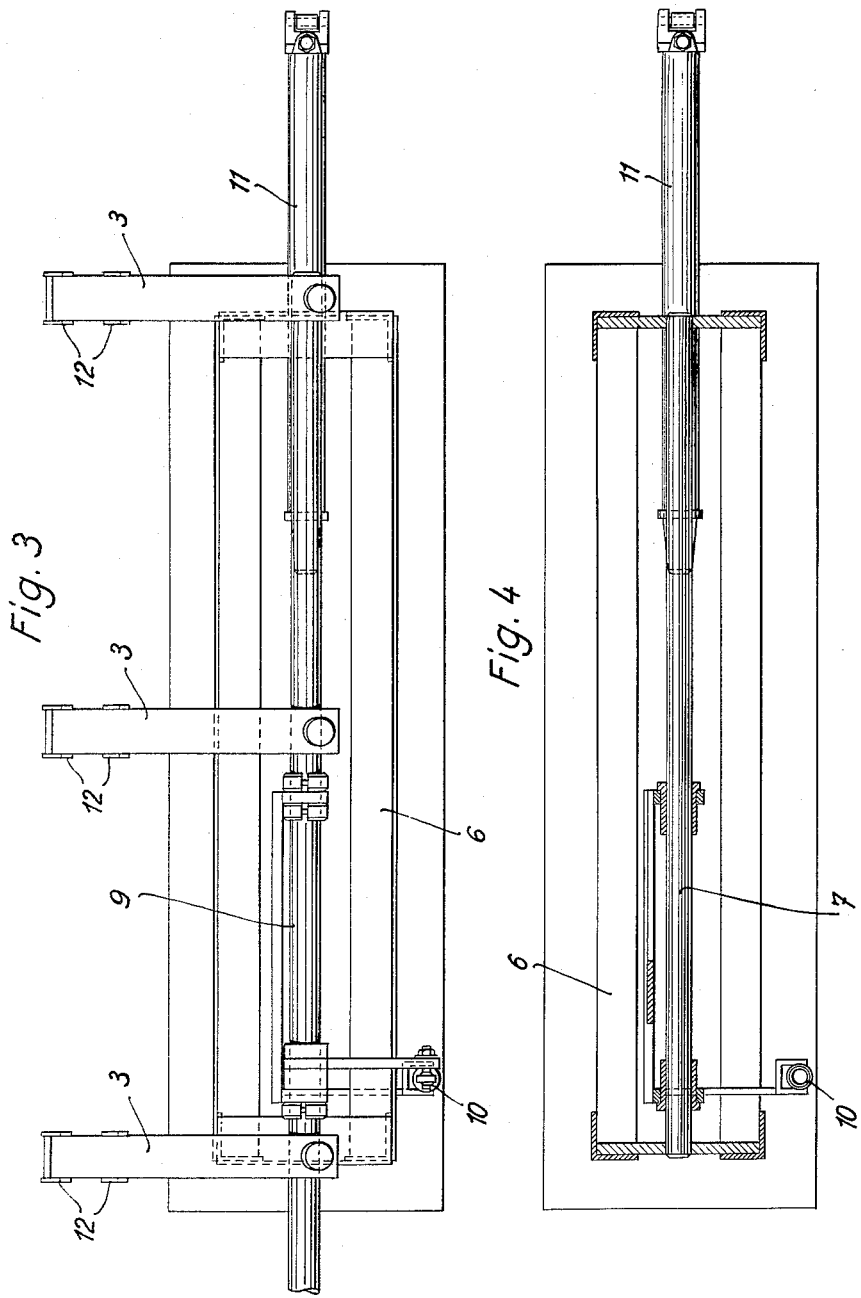

Fig. 6
Fig. 7
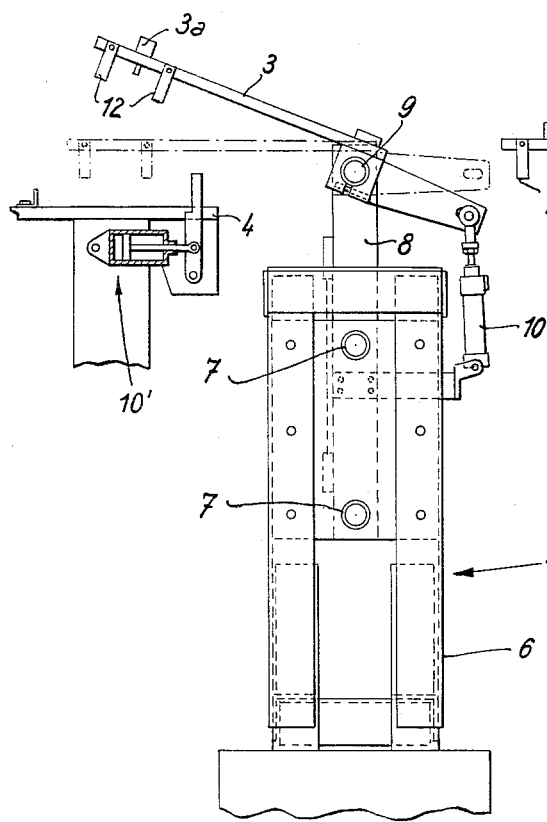
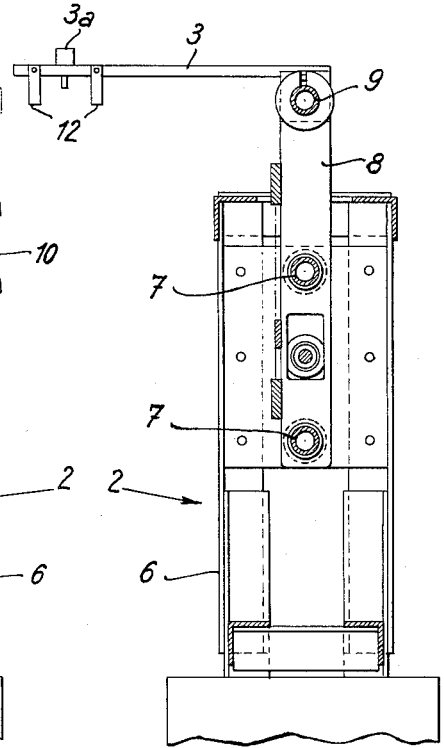

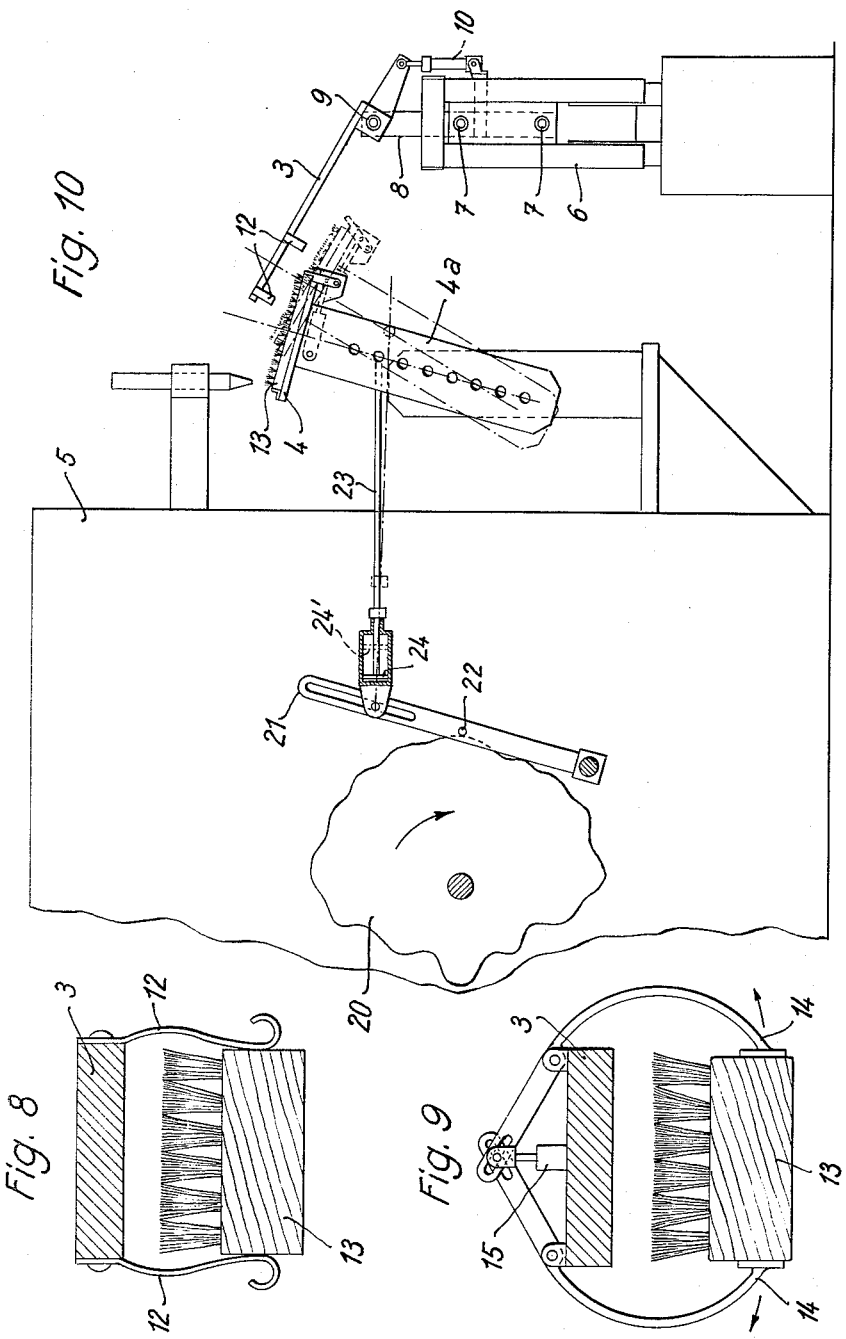

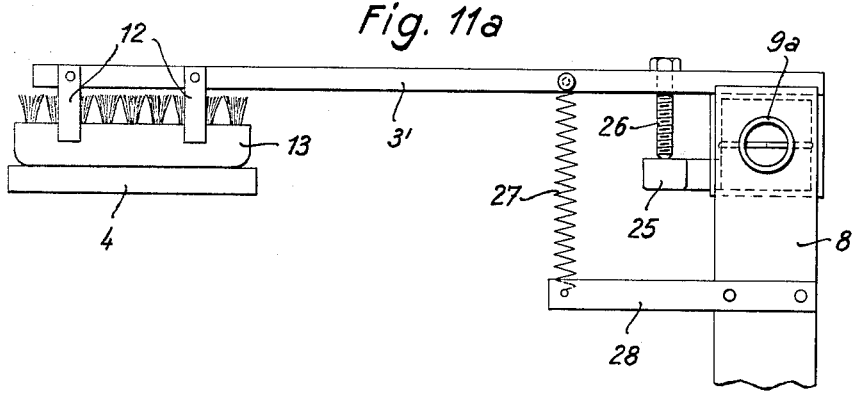
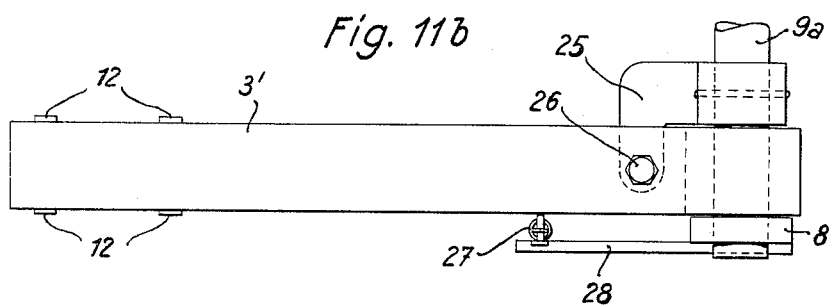
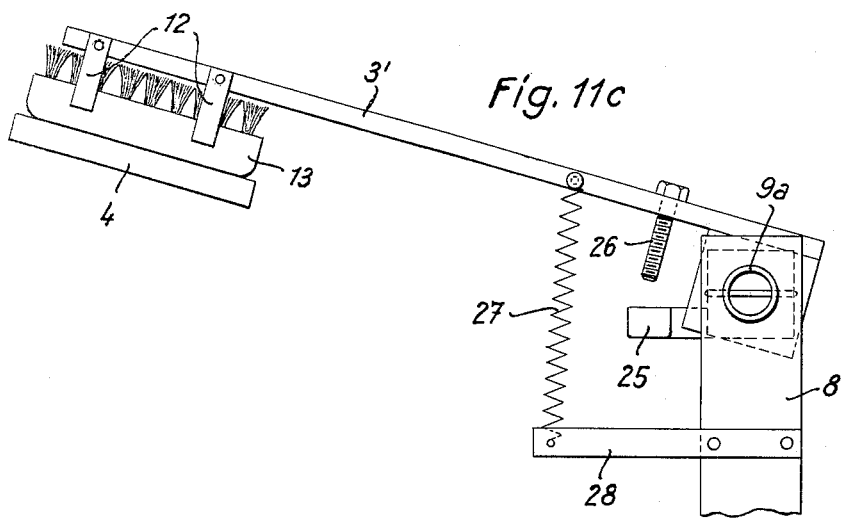

United States Patent Office 3,245,554
Patented Apr. 12, 1966

3,245,554
AUTOMATIC MACHINE FOR THE MANUFACTURE OF BRUSHES
Heinz Zahoransky, Todtnau, Black Forest, Germany
Filed Oct. 11, 1963, Ser. No. 315,488
Claims priority, application Germany, Nov. 21, 1962,
Z 9,779
5 Claims. (Cl. 214—1)

This invention relates to an automatic machine which serves for the manufacture of brushes and has, for example, one or more brush drilling, brush filling and shearing devices as well as magazines and the like for the workpieces. Brush drilling and/or filling machines have already become known in which two or more workpiece holders are associated in groups with each of the drilling and/or filling devices, one of said workpiece holders at a time holding the brush body which is being worked. During the working period a finished workpiece can be removed from and a new unmachined workpiece inserted in the other workpiece holders. In the machines which have become known up to now this inserting and removing of the workpieces is performed by hand so that for each brush drilling and filling machine, as a rule, one operating person is required.

It is the object of the present invention to provide an automatic machine for the manufacture of brushes in which the removal of the brush bodies from a magazine, the feed of the brush bodies to the drilling and/or filling devices as well as, if desired, to one or more shearing devices and finally into a second magazine can be performed without any operating person.

For achieving this object the invention provides an automatic machine for the manufacture of brushes, which comprises a number of working stations arranged side by side, workpiece holders associated with some of said working stations, and a workpiece inserting and removing device arranged in front of the working stations for co-operation therewith, said workpiece inserting and removing device consisting of a machine stand detachably connected with the working stations and having horizontally and vertically movable gripper arms for receiving, conveying and releasing the workpieces.

At least two clamping springs may be arranged on each of the gripper arms for holding the workpieces. If desired, controllable jaws may be provided on each gripper arm for holding the workpieces.

The working stations of the automatic machine may preferably be arranged at equal distances apart and the gripper arms of the workpiece inserting and removing device may likewise be mounted at equal distances apart on a common, pivotable carrier shaft. The carrier shaft is suitably mounted in a horizontal guide.

The carrier shaft may be provided respectively with a pneumatic or hydraulic device as drive for the swing movement as well as for the displacing movement.

If desired, the workpiece inserting and removing device may be arranged on a movable but lockable stand. The workpiece inserting and removing device is preferably equipped with at least one coupling means by which it is adjustable to and connectible with the individual stations of the automatic machine.

Control devices for starting and stopping the work at the individual stations are preferably provided on the workpiece inserting and removing device. In case of need, limit switch means may be arranged on at least one gripper arm, which means are adapted to bring the automatic machine to a standstill in the event of break-downs.

The control means for the workpiece holders are preferably so constructed that, after one working operation has been finished, each workpiece holder moves the workpiece located therein out of the region of the appertaining tool to such an extent that it can be gripped and conveyed by the workpiece inserting and removing device.

A control rod for the workpiece holder suitably has a displacement piston which is adapted to perform the additional swing movement of the workpiece holder independently of the control device of the drilling and/or filling machine.

If desired, at least one gripper arm of the workpiece inserting and removing device is in elastic connection with the carrier shaft in such a manner that taking along of the gripper arm is effected only in the case of the lifting rotation of the shaft, whereas for its return movement elastic restoring forces acting upon the arm are provided.

The carrier shaft may preferably be firmly connected in the vicinity of each gripper arm with a lifting arm against which an adjusting screw arranged on the gripper arm is adapted to bear. In this case a tension spring is arranged on each gripper arm, which tends to pull the gripper arm opposite to the movement of the lifting arm.

A preferred embodiment of the invention will now be described by way of example and with reference to the accompanying drawings, in which:

FIG. 1 is a schematic top plan view of the automatic machine according to the invention;

FIG. 2 is a front elevation, partly in section, of the workpiece inserting and removing device;

FIG. 3 is a top plan view thereof;

FIG. 4 is a horizontal longitudinal section through the workpiece inserting and removing device on the line IV—IV in FIG. 2;

FIG. 5 is a horizontal longitudinal section through the workpiece inserting and removing device on the line V—V in FIG. 2;

FIG. 6 is a side elevation of the workpiece inserting and removing device;

FIG. 7 is a vertical cross section through the workpiece inserting and removing device on the line VII—VII in FIG. 2;

FIG. 8 is a front elevation of a gripper arm provided with clamping springs;

FIG. 9 is a front elevation of a gripper arm provided with controllable jaws;

FIG. 10 is a schematic illustration of a swing-out device;

FIG. 11a is a schematic side view of an elastic gripper arm attachment, the arm being shown in horizontal position;

FIG. 11b is a top plan view of FIG. 11a, and

FIG. 11c is a view similar to FIG. 11a but showing the gripper arm in lifted position.

FIG. 1 shows an automatic machine indicated generally by the reference numeral 1 and comprising a magazine $M_1$ for the reception of a plurality of workpieces in the form of brush bodies or blanks 16, a drilling device B, a filling device S, a shearing device A following the drilling and filling devices mounted in a common housing 5, and a further magazine $M_2$ for receiving the worked brushes. In front of these working stations there is located a workpiece inserting and removing device designated generally by the reference numeral 2 and equipped with gripper arms 3. The free ends of the gripper arms 3 project into the regions of tool holders 4 (FIG. 10) which are movable between a closed position shown in FIG. 10 in full lines and an open position shown in dotted lines by means of a piston type operating machine 10′ similar to the piston type operating machine 10 associated with the drilling and filling devices B and S, into the region of the shearing device A and into corresponding recesses in the magazines $M_1$ and $M_2$. For the sake of clarity the working stations are shown in FIG. 1 at a distance apart from the workpiece inserting and removing device 2.

As can be seen from FIGS. 6 and 7, the workpiece inserting and removing device 2 has a machine stand 6 in which there is arranged a horizontal guide 7 for a carrier shaft 9 held by vertical supports 8. The gripper arms 3 are horizontally and vertically adjustably arranged on this carrier shaft 9. The vertical swing movement of the gripper arms 3 is effected through a piston-type operating machine 10 which is arranged to swing the carrier shaft 9 together with all gripper arms 3 mounted thereon.

Particularly in FIG. 2 a further piston-type operating machine 11 can be seen which is in connection on the one hand with the stationary machine stand 6 and on the other hand with one of the vertical supports 8 of the carrier shaft 9 and is adapted to displace the latter in horizontal direction.

As shown in FIGS. 6 to 8, four clamping springs 12 are mounted on the free end of each gripper arm 3, which springs are adapted to clampingly hold a brush body or a brush 13 between them. Another construction of the free end of a gripper arm 3 is shown in FIG. 9. Here, controllable jaws 14 are provided which, for example, can be pivoted by means of a piston-type working machine 15. A mechanical or magnetic drive of the jaws 14 is also possible.

The piston-type operating machines 10, 10', 11 and 15 are preferably pneumatic or hydraulic drives.

The automatic machine proposed by the invention operates in the following manner:

First, the magazines $M_1$ and $M_2$, the drilling device B, the filling device S and the shearing device A are to be arranged in such a manner that the distances between them are equal and correspond to the distance $a$ between each two adjacent gripper arms 3. When the aforementioned working stations $M_1$, $M_2$, B, S and A do not form a unit, it is advisable to adjustably arrange them on a base.

The workpiece inserting and removing device 2 is then to be adjusted to these working stations and secured in this position. This can particularly easily be performed by means of a special coupling and adjusting device 2a (FIG. 1).

The course of one cycle of operations is as follows:

The gripper arm 3 located at the extreme left side in FIG. 1 engages in the magazine $M_1$ and grips with its clamping springs 12 or its jaws 14 a workpiece or blank 16. By lifting the gripper arm 3, the blank 16 is taken from the magazine $M_1$ and, due to the subsequent horizontal movement of the carrier shaft 9, is moved to the right until it is in front of the drilling device B. By means of a downward swing movement the gripper arm 3 now inserts the blank 16 into the workpiece holder 4 belonging to the drilling device B (cf. FIG. 6). The workpiece holder 4 is then closed by the piston type operating machine 10' and the blank 16 is held in the holder 4, whereas the gripper arm 3 moves upwardly. The control of the drilling and filling devices then brings the workpiece holder 4 into the individual drilling positions and the drilling operations can be performed. Simultaneously, the piston-type operating machine 11 moves the carrier shaft 9 back into its initial position shown in FIG. 1 so that the said gripper arm 3, disposed at the extreme left side, again comes to stand in front of the magazine $M_1$, whereas its adjacent gripper arm 3 is now located in front of the drilling device B. After the drilling operations have been finished, the carrier shaft 9 again swings into its down-position which is shown in dot and dash lines in FIG. 6. The gripper arm 3 located at the extreme left side now repeats the just described operation, whereas its neighbouring arm 3 removes the predrilled brush blank 16 from the workpiece holder 4 belonging to the drilling device B.

It should be mentioned that the control of the workpiece holders 4 of the drilling, filling and shearing devices must be such that, after the drilling, filling and shearing operations have been finished, the workpiece holders are moved out of the region of the appertaining tool to such an extent that the brush blank 16 or the finished brush can be lifted and conveyed by the gripper arms 3 (cf. particularly FIG. 10).

Before the respective gripper arm 3 is lifted, the correspondingly controlled workpiece holder of the drilling device B releases the blank 16 so that it can be lifted by the gripper arm 3 and conveyed to the right in FIG. 1. In front of the filling device S and the shearing device A now the same operations take place as have been described in the case of the drilling device B. During each gripping operation the gripper arm 3 located at the extreme left side in FIG. 1 lifts a new brush blank 16 out of the magazine $M_1$. The gripper arm 3 located at the extreme right side in FIG. 1 inserts a ready-drilled, filled and sheared brush into the magazine $M_2$ in each cycle of operation. This gripper arm 3 is expediently equipped with controllable jaws 14 which open in the proper position and let the finished brush 13 drop into the magazine $M_2$.

If desired, the workpiece inserting and removing device 2 may be arranged on a movable stand so that it can be selectively connected with different stations of the machine. The driving stand (not shown) is preferably provided with a brake for locking the wheels. It is self-evident that the total arrangement of the automatic machine 1 may also be firmly connected on a common base plate.

Because of the necessary exact temporal tuning of the operative steps of the workpiece inserting and removing device 2 in relation to those of the machine stations $M_1$, B, S, A and $M_2$ it is necessary that the workpiece inserting and removing device 2 is synchronized with the said machine stations and has control devices for starting and stopping the work at the stations.

As can be seen from FIG. 6, each gripper arm 3 is provided with an electric limit switch 3a with the aid of which the whole machine plant can be brought to a standstill when one of the brush bodies has not been gripped in the prescribed manner.

In FIG. 10, which is a largely schematized side elevation of the automatic machine proposed by the invention, an example for the control of the workpiece holders 4 is shown. With the aid of this control, after a working operation has been finished, each workpiece holder 4 can be moved out of the region of the appertaining tool to such an extent that the workpiece located in the workpiece holder can be lifted out and conveyed by the workpiece inserting and removing device 2 to the next device. In this figure a profiled disc is designated by the reference numeral 20. A lever 21 is pivotally mounted at one of its ends and bears with a profile tracer 22 against the disc 20. The lever 21 is in connection with a leg 4a of the workpiece holder 4 through the intermediary of a control rod 23 so that the movements of the lever 21 determined by the contour of the profile disc 20 are transmitted to the tool holder 4. The control rod 23 is in connection with a displacement piston 24. This piston is adapted to effect swing movements of the workpiece holder 4 independently of the operation of the profiled disc 20 and the lever 21. When the piston 24 is brought into the position $24^1$ indicated by dot and dash lines, the workpiece holder 4 and its leg 4a will assume the position indicated also by dot and dash lines, so that the workpiece can be easily gripped and lifted by the gripper arm 3.

FIGS. 11a to 11c show another form of construction of gripper arm and its displacement device. A gripper arm $3^1$ is rotatably mounted on a carrier shaft 9a. This carrier shaft 9a is firmly connected with a lifting arm 25 which bears against an adjusting screw 26 arranged on the gripper arm $3^1$. A tension spring 27 is arranged between the gripper arm $3^1$ and a stationary arm 28 on one of the vertical supports 8. This tension spring 27 tends to pull the gripper arm $3^1$ downwardly opposite to the lifting movement of the carrier shaft 9a, the arrangement being such that the gripper arm 3¹ is driven, i.e. taken along, by the carrier shaft 9a only during the lifting movement of the same. The return movement of the gripper arm 3¹ into its adjusted position is not determined by the movement of the carrier shaft 9a and its lower turning point. Due to the non-rigid connection of the gripper arm 3¹ to the carrier shaft 9a it is possible to use the workpiece inserting and removing device 2 also with a brush working machine and the like, the magazines, workpiece holders, etc. of which have other positions than the magazines, workpiece holders, etc. of the machine for which the workpiece inserting and removing device 2 was originally destined. Moreover, the workpiece inserting and removing device 2 can also be used on brush working machines and the like in which the magazines, workpiece holders and the like are located at different altitude levels.

In the hitherto known brush drilling and/or filling machines an adjustable clamping device is usually provided which has the purpose to shorten the periods of standstill of the drilling or filling tools. These devices work with tool holders arranged in groups which within the period of time in which one brush body is worked can be alternately operated by hand for clamping or removing new brush bodies. The control of this adjustable clamping device is relatively expensive and, in spite thereof, operating personnel is still required. In comparison with the adjustable clamping device in the hitherto known machines, the additional workpiece inserting and removing device 2 in the automatic machine for the manufacture of brushes proposed by the invention hardly means an additional expenditure, however, the operating person is dispensed with.

I claim:
1. In combination with a machine having a first magazine adapted to contain a plurality of workpieces, at least two work stations each having a closable workpiece holder adapted when closed to fixedly hold the workpiece thereon, and a second magazine adapted to receive finished workpieces, said magazine and work stations being arranged in sequence equally spaced from each other, a transfer device comprising support means; at least a first and a second arm mounted on said support means spaced from each other for simultaneous movement between a first position in which one end of said first arm is aligned with said first magazine and one end of said second arm with the workpiece holder on said first work station, a second position in which said one end of said first arm is aligned with the workpiece holder of said first working station and said one end of said second arm is aligned with said workpiece holder of said second station, and a third position in which said one end of said first arm is aligned with said workpiece holder of said second station and said one end of said second arm is aligned with said second magazine, and back from said third to said second and said first position, and in each of said positions said end of each arm being movable between a raised position and a lowered position; resilient gripping means on said one end of said first arm for resiliently gripping a workpiece; a pair of gripping arms on said one end of said second arm movable between a closed position for gripping the workpiece and an open position releasing the workpiece; moving means for simultaneously moving said arms between said positions thereof; and operating means operatively connected to said gripping arms for moving the latter between said open and closed positions.

2. In combination with a machine having a first magazine adapted to contain a plurality of workpieces, at least two work stations each having a closable workpiece holder adapted when closed to fixedly hold the workpiece thereon, and a second magazine adapted to receive finished workpieces, said magazine and work stations being arranged in sequence equally spaced from each other, a transfer device comprising support means including a frame and a shaft mounted on said frame movably in axial direction and turnably about its axis; at least a first and a second arm mounted on said shaft spaced from each other for simultaneous movement therewith, said shaft being movable in axial direction between a first position in which one end of said first arm is aligned with said first magazine and one end of said second arm with the workpiece holder on said first work station, a second position in which said one end of said first arm is aligned with the workpiece holder of said first work station and said one end of said second arm is aligned with said workpiece holder of said second station, and a third position in which said one end of said first arm is aligned with said workpiece holder of said second station and said one end of said second arm is aligned with said second magazine, and back from said third to said second and said first position, and said shaft being turnable about its axis between two angularly displaced positions in one of which said ends of said arms are in a raised position and in the other of which said ends of said arms are in a lowered position; resilient gripping means on said one end of said first arm for resiliently gripping a workpiece; a pair of gripping arms on said one end of said second arm movable between a closed position for gripping the workpiece and an open position releasing the workpiece; moving means for simultaneously moving said shaft between said positions thereof; and operating means operatively connected to said gripping arms for moving the latter between said open and closed positions.

3. The combination as set forth in claim 2, wherein said arms are mounted on said shaft for movement with said shaft in axial direction but tiltable about the axis of said shaft, and including a projection for each arm fixed to said shaft aligned with the respective arm, abutment means on each arm spaced from the axis of said shaft and abutting against the respective projection, and resilient means cooperating with each arm for resiliently holding the respective abutment means on the respective projection.

4. The combination as set forth in claim 3, wherein the position of said abutment means is adjustable in a direction transverse to said arm.

5. The combination as set forth in claim 4, wherein said abutment means is constituted by a screw threadingly engaging the respective arm and abutting with the free end thereof against said projection.

References Cited by the Examiner
UNITED STATES PATENTS

| | | |
|---|---|---|
| 2,334,147 | 11/1943 | Ferenci. |
| 2,016,156 | 10/1956 | Neumair. |
| 2,933,205 | 4/1960 | MacDonald et al. |
| 2,939,572 | 6/1960 | Wurgaft. |
| 3,091,347 | 5/1963 | Sehn. |

FOREIGN PATENTS 216,559   4/1957   Australia.

MARVIN A. CHAMPION, *Primary Examiner.*
GRANVILLE Y. CUSTER, JR., D. D. SCHAPER,
*Examiners.*